Nov. 6, 1951     P. SCHILDKNECHT     2,573,991
WORK HOLDING PORTABLE CIRCULAR SAW
Filed June 29, 1946     2 SHEETS—SHEET 1
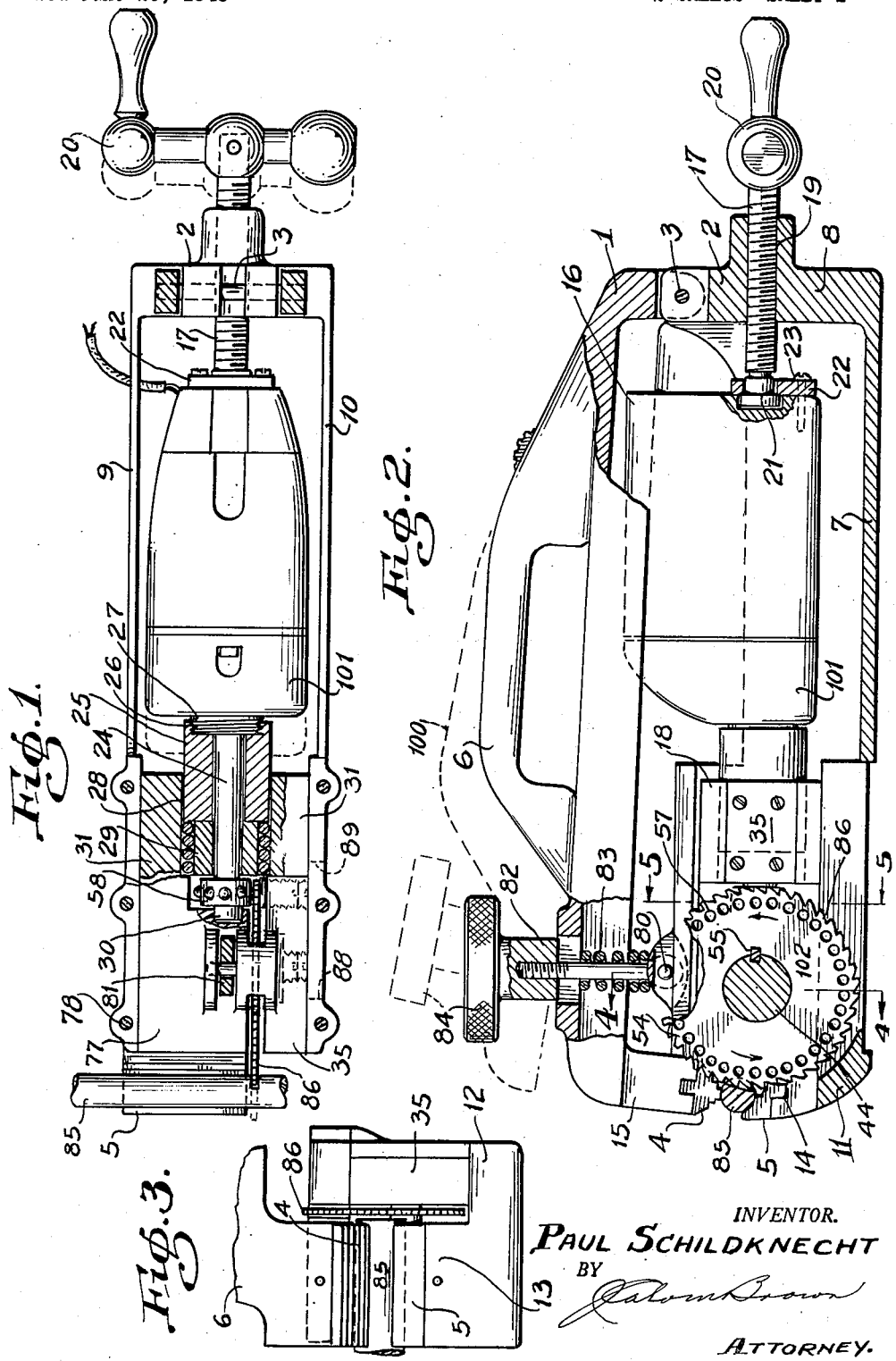
INVENTOR.
PAUL SCHILDKNECHT
BY
ATTORNEY.

Nov. 6, 1951  P. SCHILDKNECHT  2,573,991
WORK HOLDING PORTABLE CIRCULAR SAW
Filed June 29, 1946  2 SHEETS—SHEET 2
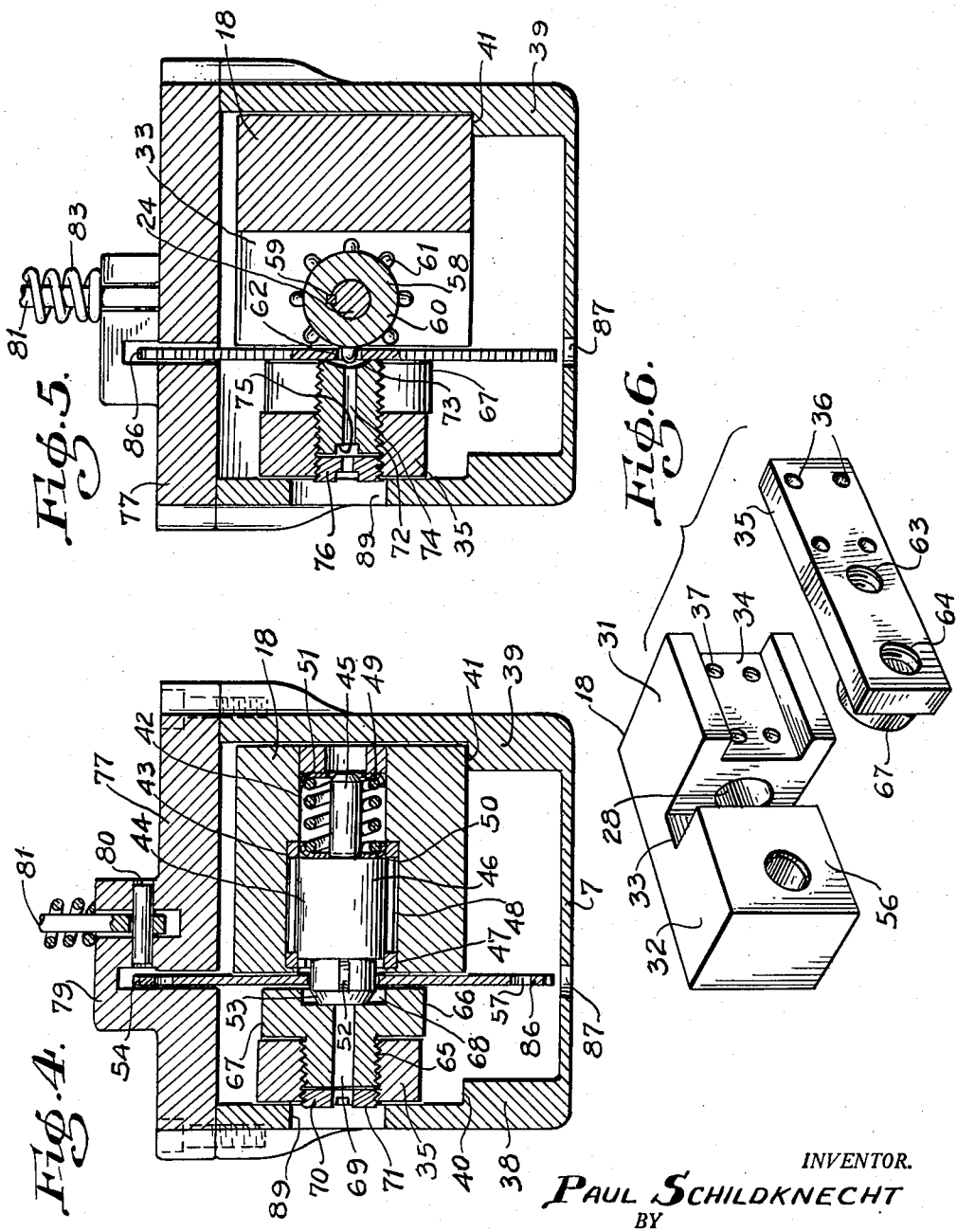
INVENTOR.
PAUL SCHILDKNECHT
BY
ATTORNEY.

Patented Nov. 6, 1951

2,573,991

UNITED STATES PATENT OFFICE 2,573,991

WORK HOLDING PORTABLE CIRCULAR SAW

Paul Schildknecht, Los Angeles, Calif., assignor, by direct and mesne assignments, to Machine-Craft Mfg. Co., Los Angeles, Calif., a corporation of California Application June 29, 1946, Serial No. 680,474

3 Claims. (Cl. 143—43)

The present invention relates to saws, and more particularly to a power-driven portable saw of light weight. Specifically, the invention is adaptable for use by plumbers and others who may desire to rapidly cut pipe, solid stock or other metal objects.

An object of the invention is the provision of a motor-driven saw adapted to readily clamp work in position to be cut, wherein the cutting of the work may be either automatically or manually controlled as to advancement of the saw through the work; which incorporates novel driving mechanism and which is sturdy and foolproof in operation.

A further object is the provision of a portable motor-driven saw which incorporates constructions permitting a ready removal and replacement of the saw, to the end that saws of different diameters may be used in the tool.

A further object is the provision of a motor-driven saw which is attractive in appearance, well balanced to permit the operator to hold the same while the saw is cutting work without undue fatigue on the part of the operator, and which operates without substantial vibration.

Another object is the provision of a power-driven saw having manually operable parts so arranged as to be readily actuated by the operator. With respect to the last object, the present device has been engineered with the idea of placing the parts in a position to be most easily controlled by the operator, and where an operator would normally expect to find them, with the result that no particular instruction or experience in the use of the tool is required by the operator.

Other objects include a power-driven saw which is inexpensive in cost of manufacture and generally superior to saws now known to the inventor.

With the above mentioned and other objects in view, the invention consists in the novel and useful provision, formation, construction, association and relative arrangement of parts, members and features, all as shown in a certain embodiment in the accompanying drawing, described generally and more particularly pointed out in the claims.

In the drawings:

Fig. 1 is a top plan view of the improved power-driven saw, certain parts being shown in section;

Fig. 2 is a side elevation of the saw shown in Fig. 1, certain parts being in section;

Fig. 3 is a fragmentary end elevation looking in the direction of the work-holding jaws of the device;

Fig. 4 is a transverse sectional view on an enlarged scale and taken on the line 4—4 of Fig. 2;

Fig. 5 is a transverse section on an enlarged scale taken on the line 5—5 of Fig. 2; and Fig. 6 is a separated perspective view of the rotor housing assembly.

Referring now to the drawings:

The improved power-driven saw is provided with upper and lower housing members 1 and 2 respectively, which are hinged together at 3 and formed to carry at what may be termed the forward ends of said members work-engaging inserts 4 and 5. The upper housing member is so constructed as to provide a handle 6, whereby the workman may either carry or hold the device in any position desired. The lower housing includes a base piece 7, an end wall 8 integrally formed with the base piece, and a pair of spaced apart substantially parallel side walls 9 and 10. A front wall 11 interconnects the base and side walls. This front wall varies as to height, as shown in Fig. 3, at 12 and 13, part 12 being of lesser height. The upper edge of the portion 13 is longitudinally grooved at 14 to carry the work-engaging insert 5. This work-engaging insert is of the usual form, being concave and stepped, as shown in cross section in Fig. 2. The insert 4, which is convex and stepped, is adapted to nest within the insert 5 when not engaging work. The upper housing member 1 has a downwardly extending front wall 15, the edge of which carries insert 4 in the same manner that the insert 5 is carried by the front wall 11. The two housing members may be hinged in the manner illustrated in Fig. 1, by providing two spaced knuckles on the wall 8 of the lower housing, with an intermediate knuckle carried by the upper housing member, there being a pin passed through said knuckles.

Adapted to be postioned between the housings and carried by the lower housing member, is an electric motor 16, there being a screw support 17 for one end of the motor, and a rotor housing block carrying, in a manner hereinafter described, the shaft end of said motor. The threaded screw 17 is passed through a threaded bore 19 in the end wall 8 of the housing 2, the outermost end of the screw being provided with a crank handle 20, while the inner end of the screw carries a freely mounted flanged washer 21. The washer is held to the wall of the motor housing by a plate 22, said plate being held to the motor in any approved manner, such as by screw 23.

The shaft end of the motor, as previously stated, is supported by the rotor housing block 18 and in the following manner: the motor shaft 24 is of extended length and spacedly surrounded by a collar 25. This collar is provided with an axial enlarged threaded counterbore 26 at one end, the threads being engageable with an externally threaded boss 27 on the motor. This collar is adapted to have a pressed fit engagement within bore 28 of housing block 18. The said collar does not extend entirely through bore 28. The motor shaft 24 is enlarged at 29, forwardly of one end of the collar 25, and then reduced to its former diameter, as shown at 30.

The housing block 18 is substantially L-shaped, with the portion 31 of a transverse width substantially equal to the spacing between the side walls 9 and 10. The portion 32 is of lesser width. See Fig. 6. A slot 33 in part separates portions 31 and 32. One side wall of portion 31 is grooved at 34 to receive a piece 35, constituting a further element of the housing block. When the piece 35 is within groove 34, the two parts may be secured together in any manner, such as by passing screws 36 transversely through said piece and into threaded openings designated generally as 37 in the base wall bounding groove 34. The said piece 35 has a length equal to that of the block 18. It will be noted that one end of the bore 28 communicates with slot 33.

The side walls 9 and 10 of the lower housing 2 are enlarged as to transverse width adjacent the base of said housing, and forwardly from the shaft end of the motor, as indicated in Figs. 4 and 5, at 38 and 39, to thereby provide shoulders 40 and 41, the said shoulders acting as tracks for slide movement of the housing block 18. The block portion 32 is provided with two axial bores of different diameters, as shown at 42 and 43. Bore 43 does not pass entirely through the block. Positioned in said bores is a shaft 44. This shaft has coaxial portions of different diameters, as indicated at 45, 46 and 47. Interposed between the portion of the shaft of greatest diameter 46 and the wall bounding bore 43, are needle bearings 48. The needle bearings are of conventional form, and are grease packed and press fitted within the bore 43. The shaft portion 45 of smallest diameter has a coil spring 49 surrounding the same. One end of said coil spring bears against an end 50 of shaft portion 46, while the opposite end of the spring may be encased within cap 51. Preferably the spring is of softer material than the shaft, and the shaft end against which the spring bears is case hardened so that if any wear occurs such wear will occur in the spring. I have found it feasible to provide a cap for the shaft end of the spring, and such a construction is purely optional. The shaft portion 47 is provided with a longitudinally extending key 52 and with a tapered nose or end 53. The saw 54 constitutes a disc provided with edge teeth and a central transverse keyway 55, whereby the saw may be placed on shaft portion 47, with the key 52 fitted within keyway 55. See Fig. 2. The arrangement is such that when the saw is carried by said shaft portion, the side of the blade lies adjacent the end 56 of the block portion 32. This is a stabilizing means for the saw and prevents wobble thereof when the blade is being rotated. The saw 54 is provided with a spaced series of transverse bores or perforations 57, adjacent the periphery thereof, and a gear 58, keyed at 59 to shaft 24, is adapted to have the teeth thereof received within said bores 57 to rotate the blade. This gear, which is best depicted in Fig. 5, has a hub 60 provided with radial extensions 61 on the periphery thereof, which extensions are semispherical or ball-like in form. Each extension so far as length is concerned is of sufficient dimension to pass transversely through a perforation 57 of the blade, see Fig. 5, at 62. To maintain the blade on the shaft portion 47, I provide certain means which is carried by piece 35, as shown in Figs. 4 and 5. Piece 35 is provided with two threaded transverse bores 63 and 64, the bore 64 receiving the threaded shank 65 of a screw 66. Said screw has an enlarged head 67 formed on its outer surface with groove 68, and the shank and the head are axially provided with a through bore 69. The screw is so adjusted within the bore 64 that the nose end of the shaft portion 47 is confined within the groove 68, with the outer face of the head lying adjacent a side of the saw 54. The screw is then locked against movement by a cap screw 70, provided with a diametric kerf 71.

The threaded bore 63 receives screw 72, the inner end thereof being provided with a concavity 73 and further provided with an axial bore 74. By means of a kerf 75, this screw may have its concave end positioned adjacent a side of the blade, with the concavity thereof receiving ends of the extensions 61 of the gear 58. After adjustment, screw 72 is held against movement by a cap screw 76.

A housing cover 77 overlies the shaft end of the motor and block 18. This cover is secured to the side walls of the housing by means of screws, as shown at 78 (Fig. 1). The cover is provided with a transverse groove at 79 in the plane of the blade, see Fig. 4. Rockingly secured by means 80 to cover 77 is a bolt 81. This bolt extends through an opening 82 in the upper housing member 1. Surrounding the bolt, and interposed between cover 77 and the upper housing member, is a coiled spring 83. A locking wheel 84 is threaded to the bolt externally of the upper housing, see Fig. 2. The spring normally urges the two housing members to separate, and such separation is controlled by turning the locking wheel. Turning the locking wheel in one direction will cause approach of the work-engaging inserts to grip work, such as shown at 85.

As best shown in Figs. 1 and 3, the side wall 9 of base 7 of the lower housing member extends forwardly beyond the side wall 10. This exposes a segment of the blade, as indicated at 86, in Fig. 1. The base 7 in the plane of the blade 54 is formed with a slot 87, the length of which is substantially equal to the diameter of the blade. The side wall 10 of the lower housing is formed with a window, the extent of which is indicated by dotted lines 88 and 89 in Fig. 1. This window constitutes a transverse slotted portion which exposes the screw openings 63 and 64 when the motor is shifted as to position within the lower housing.

The operation, uses and advantages of this invention are as follows:

The crank 20 is revolved so as to move the motor toward end wall 8. Such movement will cause the block 18 to slide on shoulders 40 and 41. The block carries with it the saw 54. The knob 84 is then turned so as to permit movement between the housing members 1 and 2, as for instance illustrated by the dotted line position for the upper housing at 100. The work 85 is then placed within the insert 5, as best shown in Fig. 2, whereupon the knob 84 is rotated to bring the insert 4 into engagement with the work, to hold the work securely. The motor 16 is then energized. Motors of the type intended for use in this invention include a gear reduction unit at 101 of the usual form, which drives the motor shaft at a reduced speed. By way of example, the present motor utilized in actual practice, revolves at 18,000 R. P. M., while the shaft revolves at 700 R. P. M. Such reduction in revolutions is of course arbitrary, and any other reduction may be utilized. The gear 58 carried by the shaft will rotate the saw 54 and adjacent the cutting edge of said saw. This gives a direct application of driving power to the saw where the power is most needed and overcomes torque effect in the shaft 44. The crank 20 is then revolved so as to feed the motor, the block 18 and the saw carried thereby forwardly toward the work. The saw will cut through the work but will not go beyond the outermost confines of the inserts 4 and 5. The saw revolves in the direction of the arrow 102, in Fig. 2, and the shaft center for the saw lies below the center of the work 85, with the result that the work is held firmly between the inserts, vibration is overcome and there is no tendency for the saw or other elements of the device to "jump up and down." Cuttings from the work are directed through the slot 87 in the base 7 of the lower housing 2. Furthermore, if any cuttings should fall within the openings 57 which receive the extension 61 of the gear 58, such cuttings will be forced into the bore 74 of screw 72 and then outwardly of said bore. This is likewise true for the screw 65, as any tendency to build up cuttings between the nose end of the shaft 44 and the groove 68 will direct said cuttings into bore 69 and outwardly thereof.

Any tendency of the blade 54 to run untrue is overcome by the close proximity of the sides of the blade to the face of part 66 and the face 56 of block 18. Hence the extensions 61 at all times enter the openings 57 to drive the blade.

To disassemble the device and place a new blade in position, the cap screw 70 is first removed and screw 65 may be backed off so as to space the same slightly from the nose 53 of the shaft 44. The cap screw 76 is removed, whereupon the screw 72 is turned to move the same away from the face of the blade. By inserting an instrument through bore 69 and pressing against the nose 53 of the shaft 44, the shaft may be retracted within the bore 42 to compress spring 49. This allows the blade to be moved slightly sideways relative to the shaft and effectively releases the blade, whereupon the blade may be removed. A new blade may then be inserted by retracting the shaft 44 and then allowing the shaft to move forwardly so that the blade is keyed thereto under urgency of the spring 49.

All parts of the device are readily accessible through the simple expedient of releasing the knob 84 and permitting the upper housing to be revolved about the hinge 2 relative to the lower housing.

I claim:
1. A saw, including a pair of housing members hinged together at one end and provided with work engaging and holding jaw portions at their other ends; an electric motor and a disc saw positioned between said housings; and means carried by one of the housing members for moving the motor and saw toward and away from any work held by the jaw portions.

2. In a portable saw device, upper and lower housing members hinged together at one end, said housing members formed with jaw portions at their other ends for engaging and holding work, an electric motor within the lower housing member, a block secured to the motor, a disc saw journaled for rotation in said block, a driving connection between the motor shaft and said saw, and means for moving the block toward or away from any work held by the jaws.

3. A portable saw, including a housing, a motor within said housing, a collar carried by the shaft end of said motor, a screw in engagement with the housing and supporting one end of said motor, a block for slide movement within the housing and formed to receive the said collar to support the motor at the opposite end thereof, a disc saw journaled in said block and a gear carried by the motor shaft for engagement with the saw adjacent the periphery thereof for driving said saw, the said screw advancing or retracting the motor to retract or advance the saw toward work.

PAUL SCHILDKNECHT.

REFERENCES CITED

The following references are of record in the file of this patent:

UNITED STATES PATENTS

| Number | Name | Date |
|---|---|---|
| 184,503 | Canedy | Nov. 21, 1876 |
| 423,278 | Robison | Mar. 11, 1890 |
| 536,826 | Best et al. | Apr. 2, 1895 |
| 766,725 | O'Neill | Aug. 2, 1904 |
| 1,388,186 | McCormick | Aug. 23, 1921 |
| 1,873,700 | Dempster | Aug. 23, 1932 |
| 2,378,554 | Irwin | June 19, 1945 |

FOREIGN PATENTS

| Number | Country | Date |
|---|---|---|
| 118,846 | Great Britain | Aug. 14, 1919 |
| 542,508 | France | May 18, 1922 |
| 401,505 | Germany | Sept. 4, 1924 |